United States Patent
Yasue et al.

(10) Patent No.: US 9,983,745 B2
(45) Date of Patent: May 29, 2018

(54) TOUCH SENSOR DEVICE AND CONTROLLER

(71) Applicant: KABUSHIKI KAISHA TOKAI RIKA DENKI SEISAKUSHO, Aichi (JP)

(72) Inventors: Yoshifumi Yasue, Aichi (JP); Masaya Maeda, Aichi (JP); Yasuhiro Fujioka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 282 days.

(21) Appl. No.: 14/847,173

(22) Filed: Sep. 8, 2015

(65) Prior Publication Data

US 2016/0085338 A1    Mar. 24, 2016

(30) Foreign Application Priority Data

Sep. 19, 2014 (JP) ................... 2014-191502
Oct. 10, 2014 (JP) ................... 2014-209473
Jan. 16, 2015 (JP) ................... 2015-006645

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01); *G06F 2203/04108* (2013.01)

(58) Field of Classification Search
CPC ...... G06F 3/044; G06F 3/0416; G06F 3/0418; G06F 2203/04108
See application file for complete search history.

(56) References Cited

U.S. PATENT DOCUMENTS

2007/0229466 A1*  10/2007  Peng .................. G06F 3/044
                                          345/173
2009/0127003 A1*  5/2009   Geaghan ............ G06F 3/0416
                                          178/18.03
(Continued)

FOREIGN PATENT DOCUMENTS

JP    2008-269642    11/2008
JP    2013-088982     5/2013
(Continued)

OTHER PUBLICATIONS

Japanese Office Action issued by the JPO in Japan Patent Application No. 2015-006645 dated Apr. 12, 2016 with accompanying English translation.
(Continued)

*Primary Examiner* — Amare Mengistu
*Assistant Examiner* — Crystal A Mathews
(74) *Attorney, Agent, or Firm* — Greenblum & Bernstein, P.L.C.

(57) ABSTRACT

A touch sensor device includes an electrode, which is located at an inner side of a touch panel, and a control unit. The control unit detects a change in a capacitance generated at the electrode when a finger approaches the electrode to determine whether or not the touch panel has been touched from the change in the capacitance. The control unit detects a maximum capacitance generated at the electrode during detection of a touched state and set a first OFF determination threshold value, which is used to detect a non-touched state, to a value that is lower than the maximum capacitance by a predetermined value which is set in advance.

7 Claims, 4 Drawing Sheets

(56) References Cited

U.S. PATENT DOCUMENTS

| | | | |
|---|---|---|---|
| 2009/0219175 A1* | 9/2009 | Takashima | G06F 3/03547 341/20 |
| 2009/0289914 A1* | 11/2009 | Cho | G06F 3/044 345/173 |
| 2010/0207890 A1* | 8/2010 | Chen | G06F 3/0416 345/173 |
| 2012/0068760 A1* | 3/2012 | Caldwell | G06F 3/0418 327/517 |
| 2012/0092296 A1 | 4/2012 | Yanase et al. | |
| 2012/0120002 A1* | 5/2012 | Ota | G06F 3/044 345/173 |
| 2012/0162105 A1* | 6/2012 | Sakurai | G06F 3/0488 345/173 |
| 2014/0078113 A1 | 3/2014 | Yamauchi | |
| 2014/0111430 A1* | 4/2014 | Shima | G06F 3/044 345/157 |
| 2014/0184551 A1 | 7/2014 | Igarashi et al. | |
| 2014/0192027 A1* | 7/2014 | Ksondzyk | G01N 27/22 345/178 |
| 2014/0210780 A1 | 7/2014 | Lee | |
| 2014/0278240 A1* | 9/2014 | Buttolo | G06F 11/30 702/182 |
| 2014/0362310 A1* | 12/2014 | Nanbu | G06F 3/044 349/12 |
| 2015/0054735 A1* | 2/2015 | Nakama | G06F 3/0325 345/156 |
| 2015/0084874 A1* | 3/2015 | Cheng | G06F 3/04883 345/173 |
| 2015/0130742 A1* | 5/2015 | Chen | G06F 3/044 345/174 |
| 2015/0268786 A1 | 9/2015 | Kitada | |
| 2016/0202768 A1* | 7/2016 | Yoshida | G06F 3/017 345/156 |

FOREIGN PATENT DOCUMENTS

| | | |
|---|---|---|
| JP | 2013-149199 | 8/2013 |
| JP | 2013-254331 | 12/2013 |
| JP | 2013-257642 | 12/2013 |
| JP | 2014-59633 | 4/2014 |
| JP | 2014-123327 | 7/2014 |
| WO | 02/35461 | 5/2002 |
| WO | 2014/092038 | 6/2014 |
| WO | 2014/113086 | 7/2014 |

OTHER PUBLICATIONS

Analog Devices, "CapTouch Programmable Controller for Single-Electrode Capacitance Sensors", Data Sheet AD7147 dated Oct. 11, 2011 (http://www.analog.com/media/en/technical-documentation/data-sheets/AD7147.pdf).

Search Report issued by the European Patent Office in E.P.O. Patent Application No. 15184162.4, dated Feb. 19, 2016.

* cited by examiner

TOUCH SENSOR DEVICE AND CONTROLLER

CROSS-REFERENCE TO RELATED APPLICATIONS

This application is based upon and claims the benefit of priority from prior Japanese Patent Applications No. 2014-191502, filed on Sep. 19, 2014, No. 2014-209473, filed on Oct. 10, 2014, and No. 2015-006645, filed on Jan. 16, 2015, the entire contents of which are incorporated herein by reference.

FIELD

This disclosure relates to a capacitive touch sensor device and a controller for a capacitive touch sensor.

BACKGROUND

Capacitive touch sensor devices are known in the art. A capacitive touch sensor device includes electrodes coupled to an inner surface of a touch panel. Touching of the touch panel is detected from a change in the capacitance at each electrode. The capacitance at each electrode may change when a finger approaches the electrode even though the finger is not contacting the touch panel.

Japanese Laid-Open Patent Publication No. 2013-149199 describes a touch sensor device including a control unit that stores an OFF determination threshold value used to determine whether or not a touched state has shifted to a non-touched state. The control unit determines that the touch sensor device is in a touched state when the capacitance of an electrode is greater than or equal to the OFF determination threshold value and determines that the touch sensor device is in a non-touched state when the capacitance is lower than the OFF determination threshold value.

SUMMARY

The capacitance of an electrode changes in accordance with the distance between a finger and the electrode. The capacitance also changes in accordance with the size of the finger that approaches the electrode. That is, the capacitance changes in accordance with the area of the finger opposing the electrode. Accordingly, the change in capacitance of an electrode differs between a user having large fingers and a user having small fingers even if the distance between the finger and the electrode is the same. In the conventional touch sensor device such as that described in the above publication, the OFF determination threshold value stored in the control unit is a fixed value. Accordingly, the distance between the touch panel and the finger for determining that the touch panel is in a non-touched state differs between users. For example, even if a user moves a finger away from the touch panel, the touch sensor device may continue to determine that the touch panel is in a touched state. Thus, when using the conventional touch sensor device, consecutive taps such as a double tap may not be correctly detected. This may be frustrating to the user.

One aspect of this disclosure is a touch sensor device including an electrode and a control unit. The electrode is located at an inner side of a touch panel. The control unit is configured to detect a change in a capacitance generated at the electrode when a finger approaches the electrode and determine whether or not the touch panel has been touched from the change in the capacitance. The control unit is further configured to detect a maximum capacitance generated at the electrode during detection of a touched state and set a first OFF determination threshold value, which is used to detect a non-touched state, to a value that is lower than the maximum capacitance by a predetermined value which is set in advance.

Other aspects and advantages of this disclosure will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

A first embodiment of a touch sensor device will now be described with reference to the drawings.

[Configuration of Touch Sensor Device]

Figure 1:
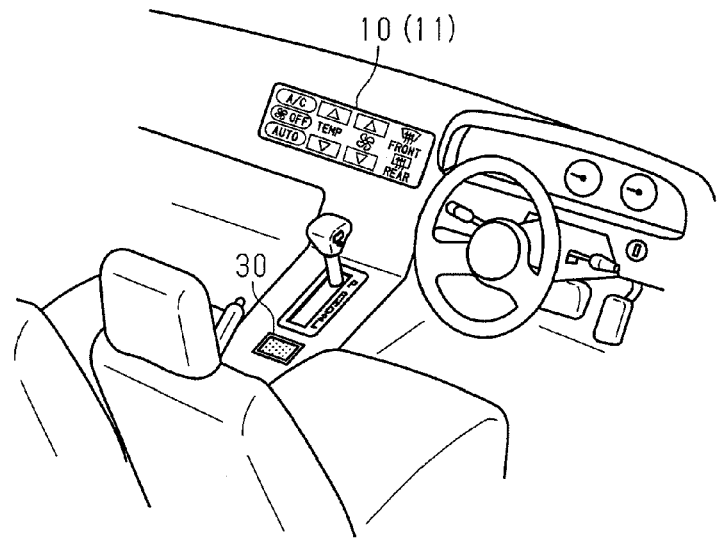
FIG. 1 is a perspective view illustrating a passenger compartment of a vehicle in which a touch sensor device is installed.

As illustrated in FIG. 1, a vehicle includes a touch sensor device 10 used to input information for controlling various devices such as the air conditioner.

Figure 2:
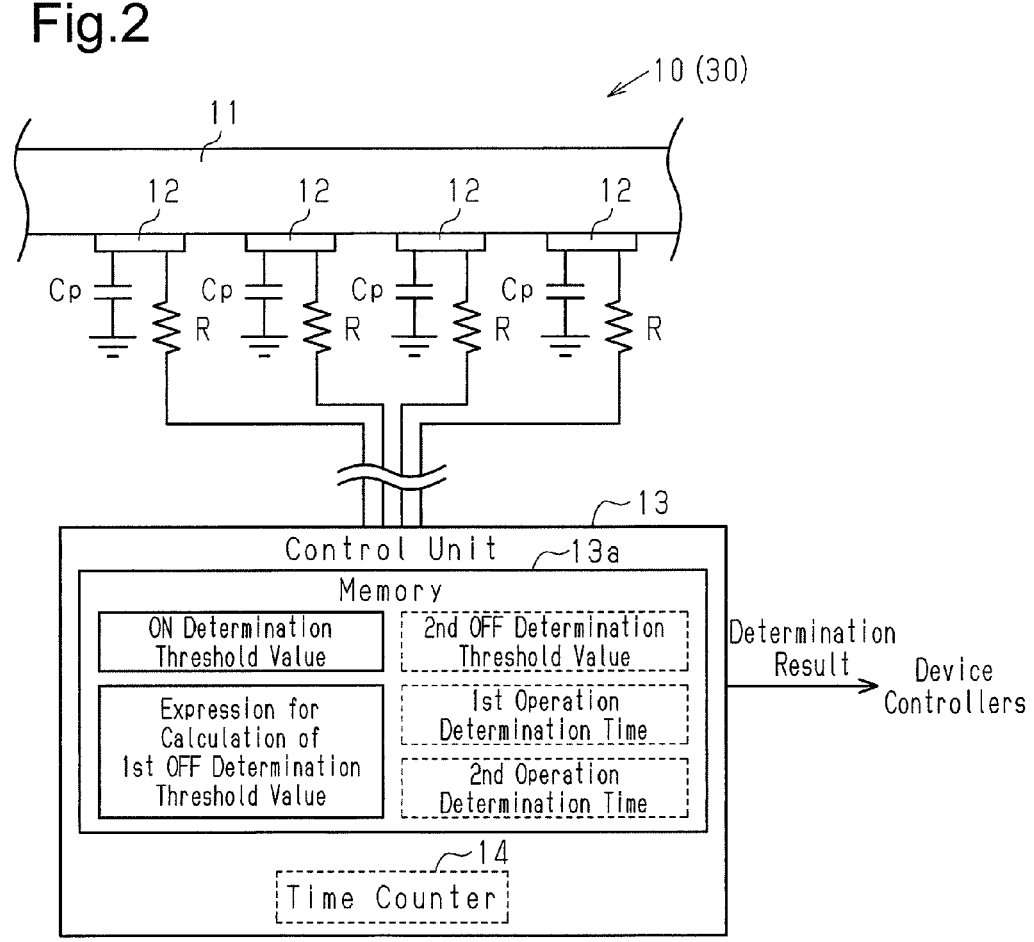
FIG. 2 is a schematic block diagram illustrating the touch sensor device.

As illustrated in FIG. 2, the touch sensor device 10 includes a touch panel 11, electrodes 12, and a control unit 13.

As illustrated in FIG. 1, the touch panel 11 is arranged in the dashboard. The touch panel 11 has an outer surface that is exposed to the outer side. Further, the touch panel 11 includes operated regions, which are operated to, for example, raise the temperature, lower the temperature, increase the fan speed, decrease the fan speed, change the direction of the air flow, switch to automatic air conditioning, and switch to manual air conditioning. The touch panel 11 is formed by an insulator such as glass or an acrylic resin.

As illustrated in FIG. 2, the electrodes 12 are adhered to the inner surface of the touch panel 11 at locations corresponding to the operated regions. The touch panel 11 protects the electrodes 12 from the outer side. A parasitic capacitance (Cp) exists between each electrode 12 and a reference potential (GND). When a conductor (e.g., user's fingertip) approaches or touches the touch panel 11, capacitance is generated between the conductor and the electrode 12. Here, the capacitance generated at the electrode corresponds to the sum (total capacitance) of the capacitance between the conductor and the electrode 12 and the parasitic capacitance (Cp). Thus, the capacitance at the electrode 12 changes (increases) when the finger approaches the electrode 12.

The control unit 13 is connected to the electrodes 12 by resistors R, respectively. Thus, voltage corresponding to the capacitance generated at the electrode 12 is supplied to the control unit 13. The control unit 13 receives the voltage corresponding to the capacitance generated at each electrode 12 to determine whether or not the touch panel 11 has been touched from changes in the capacitance. Although not illustrated in the drawings, the control unit 13 is connected to controllers for various types of devices such as an air conditioner and an audio device. Further, the control unit 13 provides each controller with a determination of whether or not the touch panel 11 was touched. The controller of each device controls the corresponding device based on the determination.

The control unit 13 includes a memory 13a. The memory 13a stores an ON determination threshold value that determines whether the touch panel 11 has shifted from a non-touched state to a touched state. The control unit 13 compares an increase amount of the capacitance at each electrode with the ON determination threshold value to detect shifting of the touch panel 11 to a touched state. The ON determination threshold value is set in advance through experiments or the like. For example, the control unit 13 determines in a non-touched state whether or not expression (1), which is illustrated below, has been satisfied. In expression (1), the "present value" refers to the presently detected capacitance, and the "preceding value" refers to the preceding detected capacitance. Accordingly, "(present value)–(preceding value)" refers to the increase amount of the capacitance. When the increase amount of the capacitance is greater than the ON determination threshold value, that is, when expression (1) is satisfied, the control unit 13 determines that the touch panel 11 has shifted from a non-touched state to a touched state and outputs the determination to the controller of each device.

(present value)–(preceding value)>(ON determination threshold value)    (1)

The memory 13a stores a first OFF determination threshold value used to determine whether or not the touch panel 11 has shifted from a touched state to a non-touched state. In the present example, expression (2), which is illustrated below, is stored in the memory 13a to calculate the first OFF determination threshold value. The control unit 13 calculates the first OFF determination threshold value in a touched state from expression (2). As illustrated in expression (2), the first OFF determination threshold value is obtained by dividing the maximum capacitance by a given set value (first predetermined set value). The maximum capacitance is the maximum value of the capacitance detected during a touched state. The control unit 13 determines in a touched state whether or not expression (3) has been satisfied, that is, whether or not the present value is lower than the first OFF determination threshold value. When expression (3) is satisfied, the control unit 13 determines that the touch panel 11 has shifted from a touched state to a non-touched state and outputs the determination to the controller of each device.

(maximum capacitance)/(set value)=(first OFF determination threshold value)    (2)

(present value)<(first OFF determination threshold value)    (3)

[Operation of Touch Sensor Device]

The operation of the touch sensor device 10 will now be described. It is known that the finger has to be squeezed by about one to two millimeters for a person to acknowledge a tactile perception of an object (here, touch panel 11). In contrast, as soon as the finger is separated from the object, a person would acknowledge that the finger is no longer touching the object (here, touch panel 11).

The operation of the touch sensor device 10 when determining that the touch panel 11 has shifted from a touched state to a non-touched state will now be described. In the case described below, the first OFF determination threshold value is calculated using the set value of "2".

Figure 3:
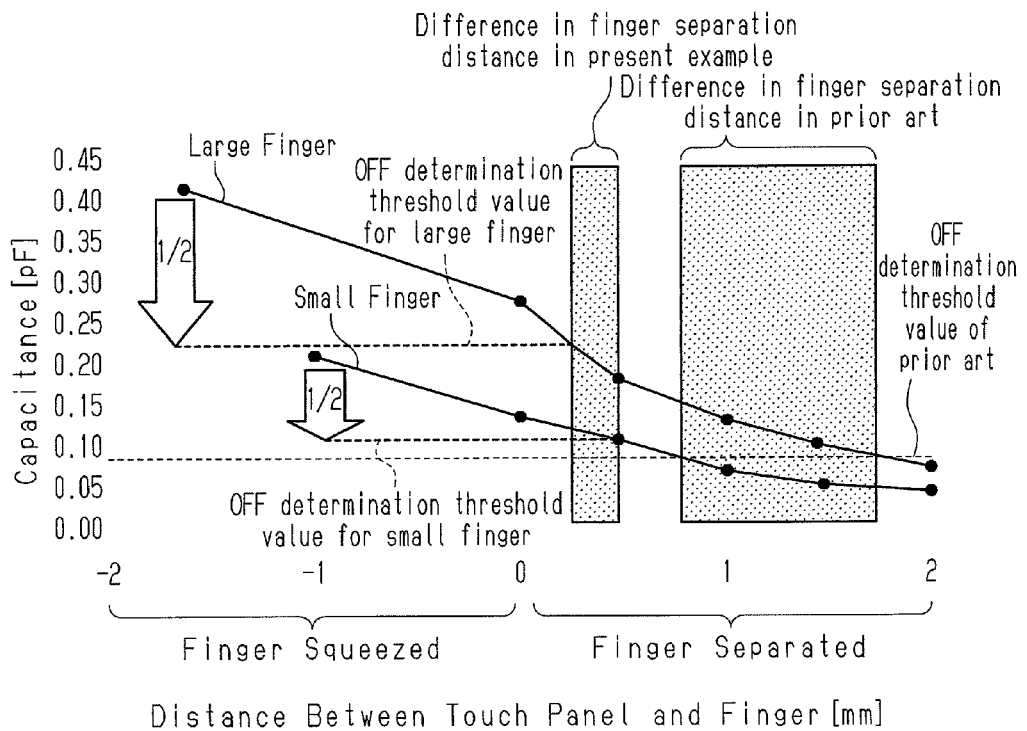
FIG. 3 is a graph schematically illustrating the relationship of the panel-finger distance and the electrode capacitance.

The area of the fingertip opposing an electrode 12 differs between a user having large fingers and a person having small fingers. FIG. 3 is a chart illustrating simulation results with two graphs. One graph is obtained by plotting changes in the capacitance when a person having large fingers touches the touch panel 11. The other graph is obtained by plotting changes in the capacitance when a person having small fingers touches the touch panel 11. As illustrated in FIG. 3, the capacitance generated at an electrode 12 when the touch panel 11 is touched differs in accordance with the size of the finger. In the present example, the control unit 13 sets the first OFF determination threshold value to a value obtained by dividing the maximum capacitance by the set value (here, two). Thus, regardless of whether the user's finger is small or large, the control unit 13 determines that the touch panel 11 has shifted from a touched state to a non-touched state when the finger is separated by approximately the same distance from the touch panel 11. Hereafter, the distance from the touch panel 11 to the separated finger will be referred to as "the finger separation distance". As illustrated in the simulation results of FIG. 3, the differences in the finger separation distance is approximately 0.3 mm to 0.5 mm. The difference in the finger separation distance is smaller than when using a fixed OFF determination threshold value like in the prior art. Thus, regardless of the finger size, the shifting from a touched state to a non-touched state is determined from nearly the same finger separation distance for any user.

The operation of the touch sensor device 10 when determining that a non-touched state has shifted to a touched state will now be described.

As illustrated in FIG. 3, the increase rate (graph gradient) of the capacitance is generally constant when the finger approaches the electrode 12 regardless of the finger size. Thus, by comparing the increased amount of the capacitance with the ON determination threshold value when a finger approaches and touches the touch panel 11, the shifting of the touch panel 11 from a non-touched state to a touched state may be detected at about the same squeezed finger amount regardless of the finger size.

In this manner, user characteristics, such as the size of the finger, have a smaller influence than the prior art on the determination of the shifting from a touch state to a non-touched state and vice-versa. This obtains high accuracy for the detection of consecutive taps such as a double tap.

The first embodiment has the advantages described below.

(1) The control unit 13 detects the maximum capacitance generated at an electrode during a touched state in which the touch panel 11 is touched. Then, the control unit 13 sets the first OFF determination threshold value to a value that is lower than the maximum capacitance by a predetermined value that is set in advance. In the present example, the first OFF determination threshold value is set at a value obtained by dividing the maximum capacitance by a first predetermined set value (e.g., two). The maximum capacitance changes in accordance with the size of the finger that approaches the electrode 12. As a result, the first OFF determination threshold value is set in accordance with the size of the finger. In this manner, the first OFF determination threshold value is dynamically set based on the present maximum capacitance, that is, in accordance with the characteristics of the user using the touch sensor device 10. In contrast with the prior art, this reduces the influences resulting from the characteristics of the user who is operating the touch sensor device 10 and improves the operation detection accuracy.

(2) The finger separation distance is substantially constant regardless of the finger size. This improves the accuracy for detecting consecutive taps such as a double tap. Thus, the touch panel 11 is easy to use.

(3) The ON determination threshold value used to determine shifting from the non-touched state to the touched state is set to a value that takes into consideration the increased amount of the capacitance. In contrast with the prior art, this reduces the influences resulting from the characteristics of the user operating the touch sensor device 10 and improves the operation detection accuracy.

(4) The user characteristics have a smaller influence than the prior art on the determination of the shifting from a touched state to a non-touched state and the determination of the shifting from a non-touched state to a touched state. This improves the operation detection accuracy of consecutive taps such as a double tap.

Second Embodiment

A second embodiment of a touch sensor device 10 will now be described.

Generally, touch operations include a short tap, a long tap, and a swipe. In the first embodiment, the control unit 13 does not distinguish these operations in a more preferable manner. When controlling a device, these operations (short tap, long tap, and swipe) may have to be distinguished from one another. In the second embodiment, the control unit 13 is configured to determine whether one of a short tap, a long tap, and a swipe has been performed and output the determination. Except for the information used to determine an operation, the control unit 13 of the second embodiment is configured in the same manner as that of the first embodiment. Thus, same reference numerals are given to those components that are the same as the corresponding components of the first embodiment. Such components will not be described in detail.

As illustrated by the broken lines in FIG. 2, the memory 13a of the control unit 13 stores a first operation determination time used to determine whether the touch operation performed on the touch panel 11 is a short tap, a long tap, or a swipe. The first operation determination time is a value compared with the time during which a touched state is detected and is set in advance through experiments or the like.

Further, the memory 13a stores a second OFF determination threshold value used to determine the shifting of the touch panel 11 from a touched state to a non-touched state during swiping of the touch panel 11. The second OFF determination threshold value is compared with the capacitance of an electrode 12 and set at a predetermined value based on experiments or the like. Preferably, the second OFF determination threshold value is set to be at least lower than the first OFF determination threshold value and slightly higher than the total capacitance of every one of the electrodes 12 in a non-touched state.

The control unit 13 also includes a time counter 14 that starts to measure time from when the touch panel 11 is switched from a non-touched state to a touched state. That is, the time counter 14 measures the time during which a touched state is detected (hereinafter, also referred to as "touched state detection time"). The measurement value of the time counter 14 is reset when the touched state shifts to the non-touched state.

The control unit 13 determines whether or not a short tap has been performed based on whether or not expression (4) has been satisfied.

(touched state detection time)<(first operation determination time)     (4)

When expression (4) is satisfied, the control unit 13 determines that a short tap has been performed on the touch panel 11. In the determination of expression (4), the determination of whether a touched state has shifted to a non-touched state, that is, the detection of a non-touched state is performed in accordance with expression (3), which is described above. Further, the control unit 13 obtains a touched position when determining that a short tap has been performed. Then, the control unit 13 provides the controller of each device with information indicating the short tap and information indicating the touched position.

When expression (4) is not satisfied, the control unit 13 determines that a long tap or a swipe has been performed on the touch panel 11. In this case, the control unit 13 obtains two touched positions before and after the first operation determination time elapses. Then, the control unit 13 compares the two touch positions.

When the two touched positions are the same, the control unit 13 determines that a long tap has been performed on the touch panel 11. Then, the control unit 13 provides the controller of each device with information indicating the long tap and information indicating the touched position. The control unit 13 determines whether or not the touch panel 11 is still in a touched state during the long tap based on whether or not expression (3) is satisfied. When expression (3) is not satisfied, the control unit 13 determines that a long tap is being continuously performed and provides the controller of each device with information indicating the long tap and information indicating the touched position. When expression (3) is satisfied, the control unit 13 determines that a long tap has been completed and provides the controller of each device with information indicating completion of the long tap.

When the two touched positions obtained before and after the first operation determination time elapses differ from each other, the control unit 13 determines that the touch panel 11 has been swiped. Then, the control unit 13 provides the controller of each device with information indicating the swipe and information indicating the touched positions. In this case, the control unit 13 determines whether or not a touched state is continuing during the swipe based on whether or not expression (5) is satisfied, that is, whether or not the present value is lower than the second OFF determination threshold value.

(present value)<(second OFF determination threshold value)     (5)

When expression (5) is not satisfied, the control unit 13 determines that the touch panel 11 is still being swiped and provides the controller of each device with information indicating the swipe and information indicating the touched positions. When expression (5) is satisfied, the control unit 13 determines that the swipe has been completed and provides the controller of each device with information indicating completion of the swipe.

[Operation of Touch Sensor Device]

The operation of the touch sensor device 10 according to the second embodiment will now be described.

The control unit 13 compares the first operation determination time stored in the memory 13a with the time during which a touched state is detected to determine whether or not a short tap has been performed. When a short tap is not performed, the control unit 13 compares two touched positions before and after the first operation determination time to determine whether a long tap or a swipe has been performed. Thus, the use of the touch sensor device 10 according to the second embodiment allows a short tap, a long tap, and a swipe to be distinguished from one another.

When the control unit 13 determines that the touch panel 11 is being swiped, the control unit 13 determines whether the capacitance at the electrode 12 where the swipe is being performed is greater than or equal to the second OFF determination threshold value to determine whether the touch panel 11 is still being swiped.

Figure 4:
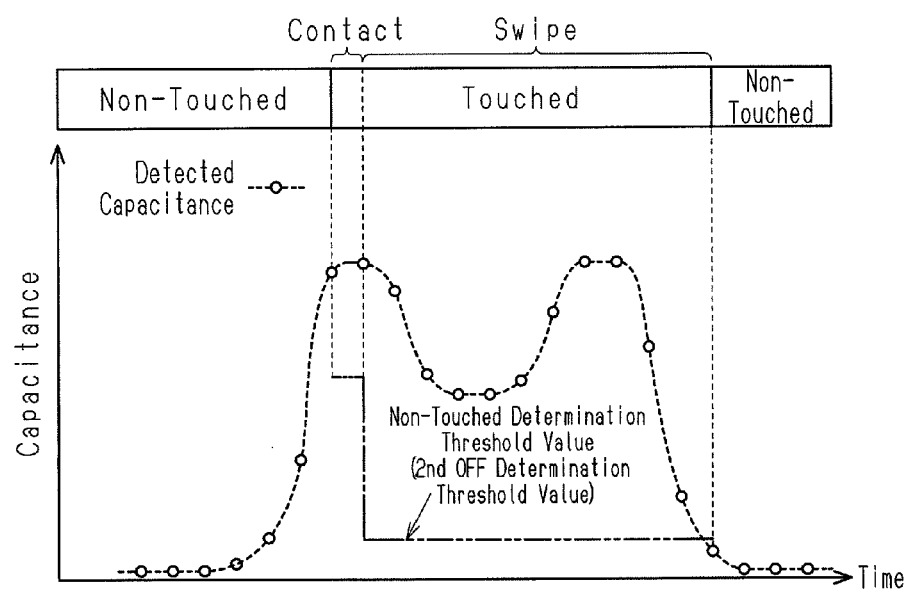
FIG. 4 is a graph illustrating one example of changes in the capacitance when the touch panel is swiped.

Swiping is performed by moving a finger on the touch panel 11. Thus, the finger is opposed to an electrode 12 for a very short period of time. Accordingly, the capacitor at the electrode 12 where swiping is performed is not sufficiently charged. Thus, when determining whether or not the touch panel 11 is still being swiped based on the first OFF determination threshold value, the control unit 13 may determine that the swiping has ended even though the touch panel 11 is actually still being swiped. Taking this into consideration, the control unit 13 determines whether or not the touch panel 11 is still being swiped based on the second OFF determination threshold value ("non-touched determination threshold value" in FIG. 4), which is lower than the first OFF determination threshold value, as illustrated by double-dashed lines in FIG. 4. This allows for swiping to be detected in a desirable manner.

In addition to the advantages of the first embodiment, the second embodiment has the advantages described below.

(5) The control unit 13 compares the first operation determination time with the touched state detection time to determine whether or not a short tap has been performed. The control unit 13 compares two touched positions before and after the first operation determination time elapses to determine whether a long tap has been performed or whether a swipe has been performed. This allows for a short tap, a long tap, and a swipe to be distinguished from one another in a more preferable manner.

(6) The memory 13a of the control unit 13 stores the second OFF determination threshold value that is lower than at least the first OFF determination threshold value and slightly higher than the total capacitance of every one of the electrodes in a non-touched state. The control unit 13 determines whether or not the touch panel 11 is still being swiped based on the second OFF determination threshold value. This allows the control unit 13 to detect a swipe in a desirable manner.

Third Embodiment

A third embodiment will now be described. Same reference numerals are given to those components that are the same as the corresponding components of the first and second embodiments. Such components will not be described in detail. In the third embodiment, an example will be described in which an item presented on a display is selected using a touchpad that is separate from the display. The operations performed on the touchpad include a short tap, a long tap, a swipe, and a double tap (consecutive short taps). In the third embodiment, the touch sensor device 10 is configured to distinguish a short tap, a long tap, a swipe, and a double tap from one another.

As illustrated in FIG. 1, a touchpad 30 is arranged on a center console. In this case, a display (not illustrated) is arranged in the dashboard instead of the touch panel 11.

The touchpad 30 has the same configuration as the touch sensor device 10 of the second embodiment and includes the touch panel 11, the electrodes 12, and the control unit 13. Since the touchpad 30 and the touch sensor device 10 have the same configuration, the touchpad 30 will not be described in detail.

As illustrated by the broken lines in FIG. 2, the memory 13a of the control unit 13 stores a second operation determination time used to determine whether the touch operation performed on the touch panel 11 is a short tap (single tap) or a double tap. The second operation determination time is a value compared with the time during which a non-touched state is detected and set in advance based on experiments or the like.

Further, the control unit 13 uses the time counter 14 to measure the time during which a non-touched state is detected (hereinafter, also referred to as "non-touched state detection time"). That is, in the third embodiment, the time counter 14 measures the time during which a touched state is detected and the time during which a non-touched state is detected. The measurement value of the time counter 14 is reset when a touched state shifts to a non-touched state and when a non-touched state shifts to a touched state.

After expression (1) and expression (4) are both satisfied (i.e., after touch operation corresponding to single tap is performed), the control unit 13 determines whether or not a touch operation performed on the touch panel 11 has been completed based on whether or not expression (6), which is illustrated below, is satisfied. That is, through the determination of expression (6), the control unit 13 determines whether a single tap is performed or a double tap is performed.

(non-touched state detection time)<(second operation determination time)     (6)

[Operation of Touchpad]

The operation of the touchpad 30 will now be described with reference to the flowchart of FIG. 5 that illustrates the processing executed by the control unit 13. The processing is executed when expression (1) is satisfied.

Figure 5:
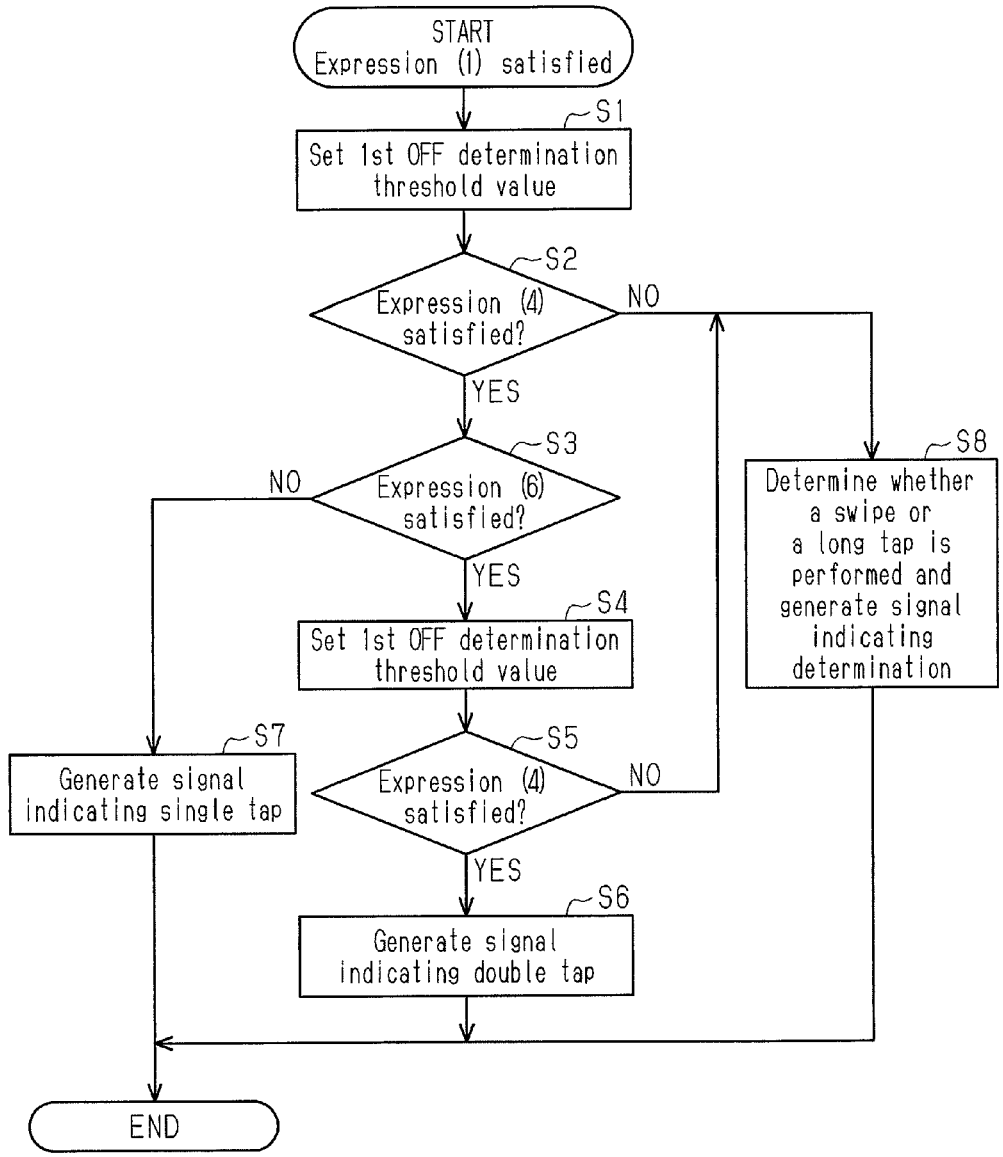
FIG. 5 is a flowchart schematically illustrating the processing executed by a control unit of the touch sensor device.

Referring to FIG. 5, when expression (1) is satisfied, the control unit 13 calculates the first OFF determination threshold value from the maximum capacitance (step S1) and then determines whether or not expression (4) is satisfied (step S2). Here, in the same manner as the first and second embodiments, the control unit 13 sets the first OFF determination threshold value to the value obtained by dividing the maximum capacitance by the set value (e.g., two). Then, when detecting a non-touched state based on expression (3), the control unit 13 determines whether or not expression (4) is satisfied.

When step S2 is YES, that is, when expression (4) is satisfied, this indicates that a touch operation corresponding to a single tap has been performed. In this case, the control unit 13 determines whether or not expression (6) is satisfied (step S3).

When step S3 is YES, that is, when expression (6) is satisfied, this indicates that after a touch operation corresponding to a single tap ends, a touch operation has been performed once more within a second operation determination time. That is, the satisfaction of expression (6) indicates that the capacitance at the electrode 12 has increased within the second operation determination time from when the capacitance became lower than the first OFF determination threshold value. In this case, the control unit 13 detects and obtains a new maximum capacitance and calculates a new first OFF determination threshold value (step S4). Then, the control unit 13 determines whether or not expression (4) is satisfied (step S5).

When step S5 is YES, that is, when expression (4) is satisfied, the control unit 13 generates a signal indicating that the operation performed on the touch panel 11 is a double tap (step S6). Then, the control unit 13 ends the series of processes.

When step S3 is NO, that is, when expression (6) is not satisfied, the control unit 13 generates a signal indicating that the operation performed on the touch panel 11 is a single tap (step S7). Then, the control unit 13 ends the series of processes.

When step S2 is NO or step S5 is NO, that is, when expression (4) is not satisfied, the control unit 13 determines whether or not the operation performed on the touch panel 11 is a swipe or a long tap and then generates a signal indicating the determination (step S8). Then, the control unit 13 ends the series of processes. The process of step S8 performed by the control unit 13 has been described in the second embodiment and thus will not be described here in detail.

In addition to the advantages of the first and second embodiments, the third embodiment has the advantages described below.

(7) The control unit 13 compares the second operation determination time and the non-touched state detection time to determine whether the operation performed on the touch panel is a single tap (short tap) or a double tap. This allows a signal tap and a double tap to be distinguished from each other.

Figure 6:
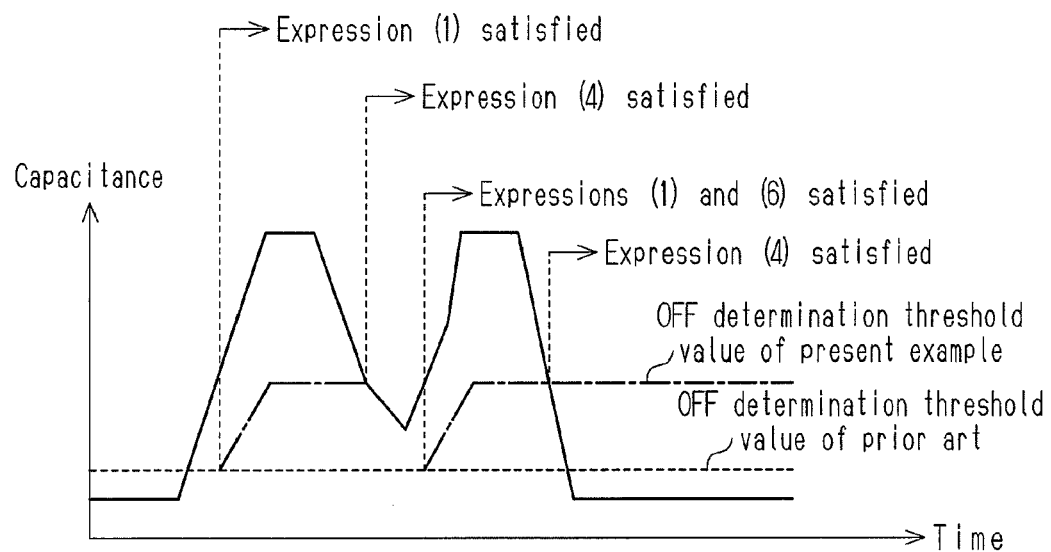
FIG. 6 is a graph illustrating changes in the capacitance when the touch panel is double tapped.

(8) The control unit 13 sets the first OFF determination threshold value to a value obtained by dividing the maximum capacitance by a set value (e.g., two). When a double tap is quickly performed on the touch panel 11, the capacitance at an electrode 12 increases before the capacitance sufficiently decreases. Thus, as illustrated in FIG. 6, when the OFF determination threshold value (first off determination threshold value) is a fixed value like in the prior art, a quick double tap would be determined as a long tap or a swipe. In the present example, the first OFF determination threshold value is set to a value obtained by dividing the maximum capacitance by a set value (e.g., two). Thus, even when a quick double tap is performed, the control unit 13 is able to detect the double tap.

It should be apparent to those skilled in the art that the present invention may be embodied in many other specific forms without departing from the spirit or scope of the invention. Particularly, it should be understood that the present invention may be embodied in the following forms.

The touch sensor device 10 in the first and second embodiments may be realized as the touchpad 30 of the third embodiment.

The touch sensor device 10 in the first and second embodiments may detect a double tap in the same manner as the third embodiment.

In each of the above embodiments, the first OFF determination threshold value is set to a value obtained by dividing the maximum capacitance by a first predetermined set value but may be set to a value obtained by subtracting a second predetermined set value from the maximum capacitance. That is, the first OFF determination threshold value only needs to be smaller by a predetermined value, which is set in advance, than the maximum capacitance detected during a touched state. In any case, the first OFF determination threshold value is set based on the present maximum capacitance. The first predetermined set value (or second predetermined set value) is set so that the range of differences in the finger separation distance when determining a non-touched state based on the first OFF determination threshold value is small and not influenced by user characteristics. This reduces the influences resulting from the characteristics of the user operating the touch sensor device 10 and improves the operation detection accuracy.

In each of the above embodiments, the first OFF determination threshold value is set to a value obtained by dividing the maximum capacitance by "2", which is the first predetermined set value. However, the first predetermined set value, which is used to calculate the first OFF determination threshold value, may be any value that is greater than "1". The capacitance generated at the electrode 12 varies in accordance with the transmittance, which is based on the material of the touch panel 11, and the distance to the fingertip, which is based on the thickness of the touch panel 11. Thus, it is preferable that the first predetermined set value be set based on experiments and simulation results.

In each of the above embodiments, the ON determination threshold value is set taking into consideration the increase amount of the capacitance. Instead, the ON determination threshold value may be set to a unique capacitance.

In each of the above embodiments, the determination results of the touch sensor device 10 are used for an air conditioner. Instead, the determination results may be used, for example, to set the volume or frequency of the audio device or to set a navigation system. When used for a navigation system, a touch sensor device that detects the touched position may be employed. Further, the touch sensor device 10 may be employed as a touch sensor device that detects whether or not a vehicle door handle has been touched.

In each of the above embodiments, the increase amount of the capacitance when detecting a touched state is obtained by subtracting the preceding value of the capacitance at an electrode from the present value. Instead, the increase amount of the capacitance may be obtained by subtracting the average value of a plurality of previous detection values from the present value.

In each of the above embodiments and modified examples, the touch sensor device 10 is used for a vehicle. Instead, the touch sensor device 10 may be used, for example, in a system used to lock and unlock a house.

In each of the above embodiment, the touch sensor device 10 is arranged in a dashboard but may be arranged at a different position. For example, the touch sensor device may be arranged in a center console or a steering wheel.

Figure 7:
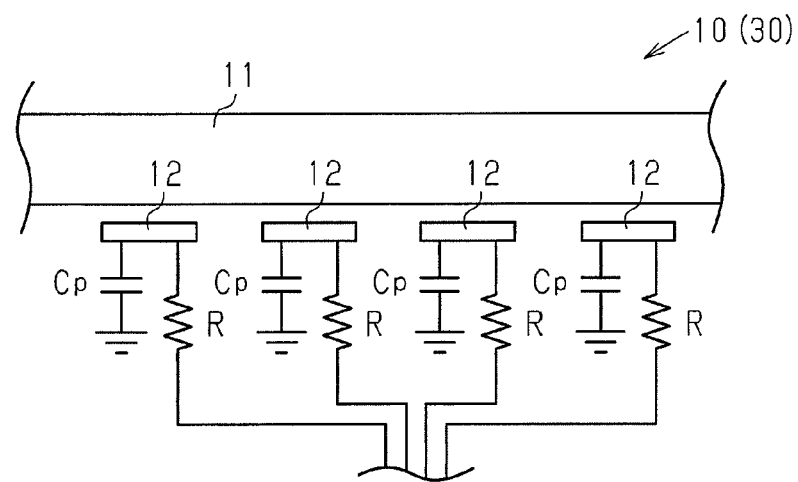
FIG. 7 is a schematic diagram of a touch sensor device and a touchpad in another example.

In each of the above embodiments, as illustrated in FIG. 7, the electrodes 12 may be separated from the touch panel 11 as long as the electrodes 12 are arranged at the inner side of the touch panel 11.

In the second embodiment, the second OFF determination threshold value is a fixed value but may be a variable value that is set based on the maximum capacitance in the same manner as the first OFF determination threshold value. For example, when the first OFF determination threshold value is set to a value obtained by dividing the maximum capacitance by "2", the second OFF determination threshold value may be set to a value obtained by dividing the maximum capacitance by "3". The second OFF determination threshold value only needs to be a value that is at least lower than the first OFF determination threshold value and slightly greater than the total capacitance of every one of the electrodes 12 in a non-touched state.

In the second embodiment, the determination of a long tap and a swipe is performed only once. However, the determination of whether a long tap or a swipe may be performed a number of times by comparing the previous touched position and the present touched position whenever calculating a new touched position.

In the third embodiment, a third OFF determination threshold value dedicated for the determination of a double tap may be set to a value that is greater than at least the first OFF determination threshold value. In this case, after expression (1) is satisfied, the control unit 13 determines that a double tap has been performed when three conditions are satisfied, which are (A) the capacitance is lower than at least the third OFF determination threshold value, (B) expression (1) is satisfied again, and (C) the capacitance is lower than the first OFF determination threshold value. In this case, during a double tap, the capacitance does not have to be lower than the first OFF determination threshold value at the first tap of the double tap. Thus, even when a quicker double tap is performed, the control unit 13 is able to correctly detect the double tap.

In each of the above embodiments, the ON determination threshold value may be a variable value or a fixed value. When the ON determination threshold value is a fixed value, the computation load on the control unit 13 is smaller than when the ON determination threshold value is a variable value. Thus, the control unit 13 may be simplified.

In each of the above embodiments, the ON determination threshold value is set as a reference value that is compared with the increase amount of the capacitance (i.e., relative value). Instead, the ON determination threshold value may be set as a reference value that is compared with the present value of the capacitance (i.e., absolute value).

The processing executed by the control unit 13 of each of the above embodiments may be realized by an exclusive hardware circuit or a group of commands (software) executed by a computer processor such as a CPU. When using software, the computer processor reads the commands from a non-transitory computer-readable medium (e.g., working memory such as a RAM) to execute processing for determining touching of the touch panel.

In this case, the group of commands includes a command for having a computer processor detect changes in the capacitance generated at an electrode 12 in accordance with the approach of a finger and a command for having the computer processor determine touching of the touch panel 11 from changes in the capacitance. When the computer processor determines whether or not the touch panel 11 has been touched, the group of commands includes a command for having the computer processor detect the maximum capacitance generated at an electrode 12 during the detection of a touched state and a command for having the computer processor set the first OFF determination threshold value, which is used to detect a non-touched state, to a value that is lower than the maximum capacitance by a predetermined value, which is set in advance.

Preferably, the group of commands include a command for having the computer processor set the first OFF determination threshold value to a value obtained by dividing the maximum capacitance by a first predetermined set value or by subtracting a second predetermined set value from the maximum capacitance.

Preferably, the group of commands includes a command for having the computer processor determine whether or not the touching of the touch panel is a short tap by comparing a predetermined first operation determination time with the time during which the touched state is detected.

Preferably, the group of commands includes a command for having the computer processor determine a touched position on the touch panel; determine whether the touching of the touch panel is a long tap or a swipe from time changes of the touched position; and when determining that the touch panel has been swiped, determine whether or not the touch panel is still being swiped based on a second OFF determination threshold value which is lower than the first OFF determination threshold value.

Preferably, the group of commands includes a command for having the computer processor determine whether or not a double tap has been performed on the touch panel when the capacitance generated at the electrode increases within a second operation determination time, which is set in advance, from when the capacitance becomes lower than the first OFF determination threshold value.

Preferably, the group of commands includes a command for having the computer processor compare a present value of the capacitance generated at the electrode with a previous value of the capacitance generated at the electrode, and determine that the non-touched state has shifted to the touched state when an increase amount of the capacitance becomes greater than an ON determination threshold value which is set in advance.

Preferably, the group of commands includes a command for having the computer processor determine that the non-touched state has shifted to the touched state when a present value of the capacitance generated at the electrode becomes greater than an ON determination threshold value which is set in advance to a fixed value.

The present examples and embodiments are to be considered as illustrative and not restrictive, and the invention is not to be limited to the details given herein, but may be modified within the scope and equivalence of the appended claims.

The invention claimed is:

1. A touch sensor device comprising:
   an electrode located at an inner side of a touch panel; and
   a control circuit that detects a change in a capacitance generated at the electrode when a finger approaches the electrode and determines whether or not the touch panel has been touched from the change in the capacitance,
   wherein the control circuit detects a maximum capacitance generated at the electrode during detection of a touched state and sets a first OFF determination threshold value, which is used to detect a non-touched state, to a value that is obtained by dividing the maximum capacitance by a predetermined set value, and
   wherein the predetermined set value is set so that a range of differences in a finger separation distance when determining the non-touched state based on the first OFF determination threshold value is smaller than when using a fixed OFF determination threshold value.

2. The touch sensor device according to claim 1, wherein the control circuit determines whether or not the touching of the touch panel is a short tap by comparing a first operation determination time, which is set in advance, with a time during which the touched state is detected.

3. The touch sensor device according to claim 2, wherein the control circuit
   determines a touched position on the touch panel,
   determines whether the touching of the touch panel is a long tap or a swipe from time changes of the touched position, and
   when determining that the touch panel has been swiped, determines whether or not the touch panel is still being swiped based on a second OFF determination threshold value which is lower than the first OFF determination threshold value.

4. The touch sensor device according to claim 2, wherein the control circuit determines whether or not a double tap has been performed on the touch panel when the capacitance generated at the electrode increases within a second operation determination time, which is set in advance, from when the capacitance becomes lower than the first OFF determination threshold value.

5. The touch sensor device according to claim 1, wherein the control circuit compares a present value of the capacitance generated at the electrode with a previous value of the capacitance generated at the electrode, and determines that the non-touched state has shifted to the touched state when an increase amount of the capacitance becomes greater than an ON determination threshold value which is set in advance.

6. The touch sensor device according to claim 1, wherein the control circuit determines that the non-touched state has shifted to the touched state when a present value of the capacitance generated at the electrode becomes greater than an ON determination threshold value which is set in advance to a fixed value.

7. A controller for controlling a touch sensor device including a touch panel to which an electrode is arranged, the controller comprising:
a computer processor including a non-transitory computer readable medium that stores a group of commands for executing a process that determines whether or not the touch panel has been touched, wherein the group of commands include
a command for having the computer processor detect a change in a capacitance generated at the electrode when a finger approaches the electrode, and
a command for having the computer processor determine whether or not the touch panel has been touched based on the change in the capacitance,
wherein the command for having the computer processor determine whether or not the touch panel has been touched includes
a command for having the computer processor detect a maximum capacitance generated at the electrode during detection of a touched state, and
a command for having the computer processor set a first OFF determination threshold value, which is used to detect a non-touched state, to a value that is obtained by dividing the maximum capacitance by a predetermined set value,
wherein the predetermined set value is set so that a range of differences in a finger separation distance when determining the non-touched state based on the first OFF determination threshold value is smaller than when using a fixed OFF determination threshold value.

* * * * *